3,133,864
HAIR AND SKIN COSMETIC AND CONDITIONER
Yoshihide Hagiwara, 65 9-chome, Honmachi, Toyonaka-shi, Osaka-fu, Japan
No Drawing. Filed Mar. 1, 1960, Ser. No. 12,003
Claims priority, application Japan Apr. 17, 1959
4 Claims. (Cl. 167—87)

This invention relates to a hair and skin cosmetic and conditioner. More particularly, the invention relates to a hair and skin cosmetic and conditioner which comprises blending the bitter components of gentianaceous plants such as *Swertia japonica* Makino and plants analogous thereto in a diluent innocuous to the human body.

An object of the invention is to provide a novel hair and skin cosmetic and conditioner for human use as well as for other animals.

A further object of the invention is to provide a method of preparing a novel hair and skin cosmetic and conditioner.

Still further objects of the invention will become apparent from the description to be given hereinafter.

I found that the bitter component of gentianaceous plants such as *Swertia japonica* Makino and plants analogous thereto had very excellent properties with respect to hair and scalp conditioning, i.e., it possesses actions which improve the complexion of the skin, particularly of the scalp, and luster of the hair.

As gentianaceous plants there are known, for example, besides *Gentiana scabra* Bunge var. *buergeri* Maximowicz, *Menyanthes trifoliata* Linné, *Swertia japonica* Makino, and *Swertia diluta* Bentham et J. D. Hooker var. *tosaensis* Hara, numerous other plants such as the following: *Crawfurdia japonica* S. et Z., *Fauria crista-galli* Mak., *Gentiana sikokiana* Maxim, *G. algida* Pall. var. *sibirica* Kusn., *Helenia corniculata* (L.) Cornaz., *Limnanthemum indicum* Thw., *Swertia tetrapetala* Pall., *Swertia pseudochineusis* Hara, *Gentiana kirilowi*, *Centaurium umbellatum* Gilib, etc.

Gentianaceous plants generally contain bitter components. In fact, many of the gentianaceous plants such as, for example, *Swertia japonica* Makino, *Gentiana scabra* Bunge var. *buergeri* Maximowicz, *Menyanthes trifoliata* Linné, *Gentiana lutea*, *Gentiana asclpiadea*, *Gentiana punctata*, *Gentiana cruciata*, etc. are known as bitter stomachics.

This invention will now be described in detail, in connection with the use of *Swertia japonica* Makino for the sake of convenience.

*Swertia japonica* Makino is a biennial that grows wild widely in the mountains and fields in Japan. Its stem is amplexicaul and exhibits a dark purple color. Its leaves are opposite and with hardly any pattern, and are of narrow linear shape and whole. In the autumn flower stalks branch out, and white five-cleft flowers bloom or burst out at their terminus. When considered from a botanical classification standpoint, *Swertia japonica* Makino belongs to the Gentianaceae family, and in England and Germany it is called Japanese chiretta and swertiakraut, respectively. This biennial Swertia when pulled completely out of the ground including its root during the flowering season and dried is called "senburi" in Japan, the dried powder being called "powdered senburi (*Swertia pulverata*)." The aqueous solution of yellowish brown color obtained by steeping these "senburi" in hot or warm water for a long period of time as well as the aforesaid "powdered senburi" have been known as bitter stomachics.

It is known that the bitter components of Swertia are contained in all parts of the aforesaid Swertia, i.e., its stalk, root, leaf, etc. with particularly large amounts being present in its flower. This is the reason for gathering Swertia in autumn during the flowering season in case it is to be used as a stomachic. In the present specification, for convenience sake, the whole plant of the fresh as well as dried Swertia, i.e., its root, stalks, leaves, flowers, etc. will all be referred hereinafter as merely Swertia, this being likewise applicable also to the other gentianaceous plants.

The bitter components of Swertia as described hereinabove are either fairly soluble or easily soluble in many solvents such as water and hot water; methyl alcohol, ethyl alcohol, isopropyl alcohol, and butyl alcohol; ethylene glycol; etc. While the bitter components of Swertia consist of glucosides and those which are non-saccharine, the non-saccharine portion of the bitter components are soluble in non-polar solvents also such as ether, chloroform, benzene, petroleum ether, etc. besides the aforementioned polar solvents, such as water, alcohol, etc.

According to Nihon Yakugaku Zasshi (Journal of the Pharmaceutical Society of Japan), 1927, vol. 47, page 133, Tatsuo Kariyone and Giichi Matsushima performed the following experiment and separated the bitter glucosides from Swertia and named it Swertiamarin. Namely, they dumped 1 kg. of Swertia together with a small amount of calcium carbonate into boiling ethyl alcohol and after boiling for about 30 minutes and destroying the enzymes, the Sewtria was shredded into small pieces. After digesting this several times with ethyl alcohol, the decoctions were combined and distilled under reduced pressure. Then the residue was dissolved in about 4 liters of water, and the insoluble matter was filtered out. To the filtrate a solution of lead acetate was added, while stirring, until no further precipitation occurred, when it was stopped, and this was filtered out. The said filtrate was saturated with hydrogen sulfide, and the precipitate of lead sulfide formed was filtered out. This was followed by concentrating the filtrate by evaporation under reduced pressure whereby a sirupy extract (E) was obtained which was digested several times with ethyl acetate, the amount of ethyl acetate being 400 milliliters each time. When the decoction was suddenly cooled with a mixture of ice and sodium chloride, a yellow non-crystalline substance, a glucoside, was separated. The thus obtained crude glucoside amounted to about 4% of the Swertia material. When this crude glucoside was refined by repeating the warming and the dissolving steps several times followed by cooling and separating, a substance was obtained which was pure white with a melting point of 112–114° C. (contracting at ca. 60° C.). This substance was named Swertiamarin. Furthermore, according to the aforementioned workers in the art the said Swertiamarin has the molecular formula $C_{16}H_{22}O_{10}$ and is said to form similarly the bitter component erythrocentaurin ($C_{10}H_8O_3$) and dextrose by hydrolysis, as indicated by Formula a, below, with acid or emulsion.

(a) 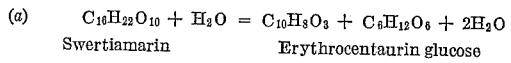
　　Swertiamarin　　　　Erythrocentaurin　glucose

This erythrocentaurin also contains bitter components.

In a still another publication, it is reported that Swertia also contains alkaloids such as gentianin ($C_{10}H_9O_2N$) and the like and that these alkaloids likewise possess stimulative and anaesthetic actions as well as being bitter. That is, in the Journal of the Pharmaceutical Society of Japan, 1957, vol. 77, No. 1, Shoji Shibata, Michiichi Fujita, and Hiroshi Igeta report that an alkaloid gentianin was extracted and separated from Swertia in accordance with the following process:

To 750 grams of dried and finely shredded Swertia were added 150 milliliters of ammonia water and 4 liters of chloroform. After steeping for 4 days, the Swertia was filtered out and the chloroform solution was shaken with 10% sulfuric acid. Then chloroform was separated out.

The sulfuric acid solution was made alkaline with ammonia, the solute was again dissolved into chloroform. Then, when the chloroform was distilled off, 7.9 grams of a brown crystalline mass were obtained. This was dissolved in 200 milliliters of acetone/benzene (1:9), poured into chromatographic column of 40 grams of alumina, and selectively separated with said acetone/benzene solvent. When the concentrated solutions of the respective fractions were performed PPC in parallel with the standard gentianin as shown in Table A, below, the R$f$ values of Fractions Nos. 1 and 2 coincided with the R$f$ value of gentianin, Fractions Nos. 3–8 were negative, and Fraction No. 9 dissolved with methanol showed a different R$f$ value from that of gentianin.

TABLE A

| Fraction No. | Solvent | Ml. | Color | R$f$ of Concd. Fraction |
|---|---|---|---|---|
| 1 | | 300 | Slight yellow | 0.81 |
| 2 | | 300 | do | 0.81 |
| 3 | | 300 | Yellow | |
| 4 | | 200 | do | |
| 5 | | 200 | Slight yellow | |
| 6 | | 200 | do | |
| 7 | | 200 | do | |
| 8 | acetone | 100 | Yellow | |
| 9 | methanol | 100 | Orange | 0.38 |

When Fractions Nos. 1 and 2 were combined, and the residuum after distilling off of the solvent was recrystallized from petroleum benzene, 5.7 grams (0.76%) of white raphides with a M.P. of 81–83° C. were obtained whose oxalate M.P. was 152–153° C., bromide M.P. was 177–178° C. and chloride M.P. was 165–170° C. As regards Fractions Nos. 3–9, a minute investigation could not be made, since it would decompose if recrystallization were attempted.

As aforementioned, while an alkaloid such as gentianin is contained in Swertia, such alkaloids combine with acids and readily form salts, which salts are easily soluble in various polar solvents such as water, alcohol, etc. Moreover, with respect to the alkaloids such as gentianin contained in Swertia, while the salts thereof in a basic state are insoluble in polar solvents, the alkaloids possess considerable solubility in polar solvents, such as water, alcohols, etc., and are very easily soluble in nonpolar solvents, such as chloroform, ether, benzene, etc. Therefore, if Swertia is extracted with polar solvents, the alkaloids contained in Swertia are also extracted together with the other bitter components. In fact, in my studies I found that alkaloids were also contained together with the bitter components in the aforementioned sirupy extract (E) obtained in the extraction process of Swertiamarin.

As described above, alkaloids such as gentianin, being also contained in Swertia besides the bitter components such as Swertiamarin, Swertianolin, erythrocentaurin, and Swertianol; accordingly, in this specification all the foregoing will be generically referred to as the bitter components of Swertia.

Furthermore, *Gentiana scabra* Bunge var. *buergeri* Maximowicz contains about 8–10% of a bitter glucoside Gentiopicrin ($C_{16}H_{20}O_9$) and about 0.1–0.15% of gentianin, and *Menyanthes trifoliata* Linné contains about 1.0% bitter glucoside Meliatin ($C_{15}H_{22}O_9$) and a small amount of gentianin (alkaloid). Further, *Swertia diluta* Bentham et J. D. Hooker var. *tosaensis* Hara also contains Swertianol ($C_{13}H_7O_5$) $OCH_3$, Swertianolin ($C_{19}H_{17}O_{10}$), Swertiamarin ($C_{16}H_{22}O_{10}$), and gentianin ($C_{10}H_9O_2N$), etc.

All the following gentianaceous plants also contain bitter components including the alkaloid gentianin: namely, *Fauri cristi-galli*, *Gentiana sikokiana*, *Gentiana algida* var. *sibirica*, *Helenica corniculata*, *Nymphoides indicia*, *Swertia tetrapetala*, *S. pseudochinensis*, *S. bimaculata*, *Gentia kirilowi*, and *Centaurium umbellatum* Gilib.

The bitter glucosides or alkaloids such as gentianin, etc. contained in the numerous gentianaceous plants, mentioned above, can all be extracted with the same method as is used in case of extraction of Swertiamarin and gentianin from Swertia.

According to my studies, I found that one or two or more types of bitter components contained in the above-described gentianaceous plants possess the faculty of being an excellent hair and skin cosmetic and conditioning agent, particularly of the scalp, of animals including man. I also found in accordance with this invention that among these bitter components of gentianaceous plants, the bitter glucosides and their decomposition products such as Swertiamarin, Gentiopicrin, and erythrocentaurin, and alkaloids singly such as gentianin or the group of bitter substances having these as their chief ingredient, were particularly effective in their faculty of conditioning the hair and skin.

Moreover, these bitter components of gentianaceous plants can be used in the form in which one or two or more of the gentianaceous plants have been extracted with solvents as already described above or in the form of a powder of one or more of gentianaceous plant such as "powdered senburi."

Furthermore, these bitter components of gentianaceous plants are not only harmless to living creatures such as man and in particular to their skin surface but it can also be used in a form where it has been dissolved, mixed or dispersed in any kind of diluent so long as the bitter components themselves are not destroyed. Moreover, the cosmetic and conditioning activities are manifested even when the concentration of the bitter components is 0.001% by weight or less. Hence, as the diluent, any of the following liquids such as water, an alcoholic-aqueous solution, etc.; solids in the form of powder such as talc, bentonite, calcium carbonate, etc.; ointments; toilet water; lotions; aerosol; etc. may be used.

Therefore, if the bitter components of Gentianaceous plants are either blended or dissolved in hair pomades, toilet waters, cosmetic lotions, aerosols, etc., a hair and skin conditioner is prepared. In accordance with this invention, by dissolving, mixing, or dispersing the bitter components of Swertia in diluents, as described above, in a concentration generally within the range of 0.001–1% by weight, a novel hair and skin cosmetic and conditioning composition is prepared which may be applied to desired areas of the hair and skin to improve the appearance of the same. Moreover, even if the content of the bitter component in the diluent may be more than 1% by weight, say, about 10% by weight or so, the activity of the hair and skin cosmetic and conditioner, can be achieved without any ill effects to the human body. However, to increase the concentration much more than these figures does not necessarily result in proportionately greater effectiveness. Therefore, from the standpoint of economy and effectiveness, the use in concentrations from 0.001–1% by weight of preferable.

Moreover, the hair and skin cosmetic and conditioner of this invention may be that in which the dried powder of gentianaceous plants, which is, for example, in a state where it has been mixed in an ointment or dispersed in a milky suspension; or it may be used in a state in which the fresh or dried gentianaceous plant has been extracted with water, an alcoholic-aqueous solution, alcohol, etc. and which extract still contains such impurities as proteins, tannic acid, a viscous liquid of saponin, etc. It may also be in a state in which after extraction of the fresh or dried gentianaceous plant or the grounded material thereof with solvents such as water, alcohol, etc. the aforesaid proteins, tannic acid, a viscous liquid of saponin, etc. are separated and removed, thus making it into a solution containing the various bitter components in a comparatively pure mixed state, and thereafter used as it is or after further diluting to the desired concentration with other diluents. Needless to say, the hair and skin cosmetic and conditioner of this invention may also be that in which one or two or more of the bitter glucosides and the decomposition products such as the aforesaid Swertiamarin, Gentiopicrin, Swertianolin, erythrocentaurin, etc. and alkaloids such as gentianin, etc., having been extracted individually in a substantially pure state, have been dissolved or blended in a suitable diluent.

While it suffices in the application of the hair and skin cosmetic and conditioner of this invention to the affected parts to use it one or two times daily, needless to say, an increase in the number of times above these figures is permissible. Moreover, the hair and skin cosmetic and conditioner of this invention may be blended and used with any other ingredients that do not destroy the bitter components contained in gentianaceous plants. Examples of such ingredients are ethnylestradiol, tincture of capsicum, chondoroitinsulfuric acid, calcium pantothenate, cepharantine, sensitive pigments, hinokitiol, recitin, etc.

The following example illustrates the nature of the invention but is not intended to limit it in any manner except as it is limited in the appended claims.

*Example*

50 grams of Swertia in accordance with Japan Pharmacopoeia, grown in Akita Prefecture, Japan, were shredded fine and were dumped together with 2 grams of precipitated calcium carbonate into an Erlenmeyer flask of 2 liters' capacity to which was attached a cooler containing 750 milliliters of boiling ethyl alcohol. After boiling for about 30 minutes and destroying the enzymes, the mixture was suction filtered, and the drug obtained was dried at a temperature below 60° C. The dried drug was comminuted in a mortar, and was digested with 250 milliliters of ethyl alcohol at 40–45° C., and after suction filtering, again digested. This was repeated several times, and about 1.5 liters of a very dark brown decoction were obtained. When this decoction was distilled under reduced pressure and the alcohol was distilled off, a dark greenish brown residue was obtained. 100 milliliters of water were added to the foregoing, and after left standing overnight, it was filtered, and 120 milliliters of a filtrate (A) were obtained. To this were added 90 milliliters of a 2% lead acetate solution to precipitate the protein, and the excess lead was precipitated and removed as lead sulfide by filtering through hydrogen sulfide, whereby about 200 milliliters of a filtrate (B) were obtained. While Tatsuo Kariyone and Giichi Matsushima, abovementioned, evaporated this filtrate and by further performing the digestive extraction of the residue several times with ethyl acetate obtained Swertiamarin, in this example, to 200 milliliters of the said filtrate (B) 800 milliliters of ethanol Japan Pharmacopoeia were added immediately and made into a 72% by volume alcoholic-aqueous solution, which was then used clinically as a hair and skin cosmetic and conditioner. This 72% alcoholic-aqueous solution will for convenience sake be referred to as test drug I. This test drug I contains in a mixed state about 0.1–0.2% of the bitter components of Swertiamarin, erythrocentaurin, gentianin, etc.

On the other hand, to 200 milliliters of a filtrate prepared in the same manner as the aforesaid filtrate (B) 600 milliliters of water and 2400 milliliters of ethanol Japan Pharmacopoeia were added to make the total volume 3200 milliliters, and this solution was then used clinically as test drug II. If, as in the case of test drug I, the bitter components contained in this test drug II are present, it would contain about 0.033–0.066% of the bitter components of Swertia with its chief components being Swertiamarin, erythrocentaurin, and gentianin.

Additionally, a sirupy extract obtained by distilling under reduced pressure 200 milliliters of a filtrate prepared separately corresponding to the aforesaid filtrate (B) was extracted with ethyl acetate 5 times using 40 milliliters each time. Then the ethyl acetate was removed by evaporating under reduced pressure. To the residuum, which amounted to about 2 grams, 2 liters of sterile distilled water were added, and this was used in a biochemical experiment as test drug III. This test drug III contained about 0.1% by weight in the mixed state of bitter components with the chief components being Swertiamarin, erythrocentaurin, and gentianin.

Further, to 200 milliliters of filtrate (B) prepared in a similar manner as described hereinabove 5 milliliters of ammonia water were added and made alkaline. Using 50 milliliters of chloroform each time, the alkaloids were dissolved into the chloroform layer 3 times. Then these chloroform solutions were combined and 10% hydrochloric acid was added to make it acidic according to a litmus test. The alkaloids were then dissolved into the aqueous hydrochloric acid layer. After repeating this 3 times, the separately obtained aqueous hydrochloric acid solutions were combined. Ammonia water was then added to make it alkaline according to a litmus test. To this was further added 50 milliliters of chloroform and shaken. Then the addition of aqueous hydrochloric acid and chloroform was repeated again and again until the chloroform would not color. Finally, the chloroform layer was evaporated and distilled off, whereupon 0.3 gram of white raphides of an alkaloid gentianin (M.P. 81–82° C.) were obtained. This was disclosed in 600 milliliters of 70% alcohol and made into a gentianin alcohol solution and was clinically used as test drug IV.

The test drugs I, II, III and IV were clinically tested by the application of said drugs in suitable solvent media to affected areas in any manner, as by brushing, for example. The novel hair and skin cosmetic and conditioner of the present invention acts to improve the complexion of the skin and luster of the hair, e.g., invigorating the hair and skin of the individual.

As described above, the bitter glucosides such as Swertiamarin, Swertianolin, Gentiopicrin, Meliatin, Gentigine, etc. contained in genaceous plants such as Swertia, the decomposition products of the above glucosides, and alkaloids such as gentianin used singly or in a combined state of two or more show conspicuous effectiveness. Accordingly, although the invention has been described with respect to gentianaceous plants which are known to normally contain these components, it is to be understood that the present invention need not necessarily be limited to gentianaceous plants only but should include those components that are identical to the bitter glucosides contained in gentianaceous plants, their decomposition products, and bitter components such as gentianin which are alkaloids or those extracted components of other plants which contain components capable of forming substances identical to either of the aforesaid bitter components by means of hydrolysis or chemical reactions after being brushed on the skin, which may also be dissolved or blended, as already described, in a diluent which does not harm animal life to obtain the novel hair and skin cosmetic and conditioner of this invention.

What is claimed is:

1. A method of treating the hair and skin with a cosmetic conditioner composition comprising at least one of the bitter components of the plant *Swertia japonica* Makino selected from the group consisting of Swertiamarin, erythrocentaurin and gentianin, and a diluent inert to skin surfaces, said bitter component being present in an amount of about 0.001 to about 1% by weight.

2. A method of treating the hair and skin comprising the steps of applying to the hair and skin a cosmetic conditioner composition consisting essentially of a diluent inert to skin surfaces selected from the group consisting of water, ethanol, and a water-ethanol mixture, and 0.001 to 1% by weight of at least one of the bitter components of the plant *Swertia japonica* Makino, said bitter components being selected from the group consisting of Swertiamarin, erythrocentaurin and gentianin.

3. A method of treating the hair and skin comprising the steps of applying to the hair and skin a cosmetic-conditioner composition consisting essentially of a diluent inert to skin surfaces selected from the group consisting of water, ethanol, and a water-ethanol mixture, and about 0.001 to about 1% by weight of an intimate mixture of Swertiamarin, erythrocentaurin and gentianin, the bitter components of the plant *Swertia japonica* Makino.

4. A cosmetic composition consisting essentially of about 0.001 to about 1% by weight of an intimate mixture of Swertiamarin, erythrocentaurin and gentianin, the bitter components of the plant *Swertia japonica* Makino, dispersed in a cosmetic base which is inert to skin surfaces.

References Cited in the file of this patent

Merck Index, 6th Ed., Merck & Co., Inc., Rahway, N.J. (1952), pp. 456, 606 and 928.

Merck Index, 7th Ed., Merck & Co., Inc., Rahway, N.J. (1960), pages 476 (particularly Gentiopicrin).

Zasshi: J. Pharm. Soc. Japan, vol. 47 (1927), pp. 133–144.

J.A.M.A., vol. 139, No. 13, March 26, 1949, pp. 840–844.

Merck Index, 6th Ed., Merck and Co., Inc., Rahway, N.J. (1952), page 399.

De Navarre: The Chemistry and Manufacture of Cosmetics, Van Nostrand Co., Inc., N.Y. (1941) (pages 661–2).

Shibata et al.: Pharml. Soc. of Japan, 77(1): 116–118.

Korte: Chem. Ber. 87: page 136 (1954).